July 30, 1968     R. G. LINDNER     3,394,514
METAL CELLULAR FLOORING SECTIONS AND COMPOSITE
FLOOR UTILIZING THE SAME
Filed Aug. 29, 1966     2 Sheets-Sheet 1
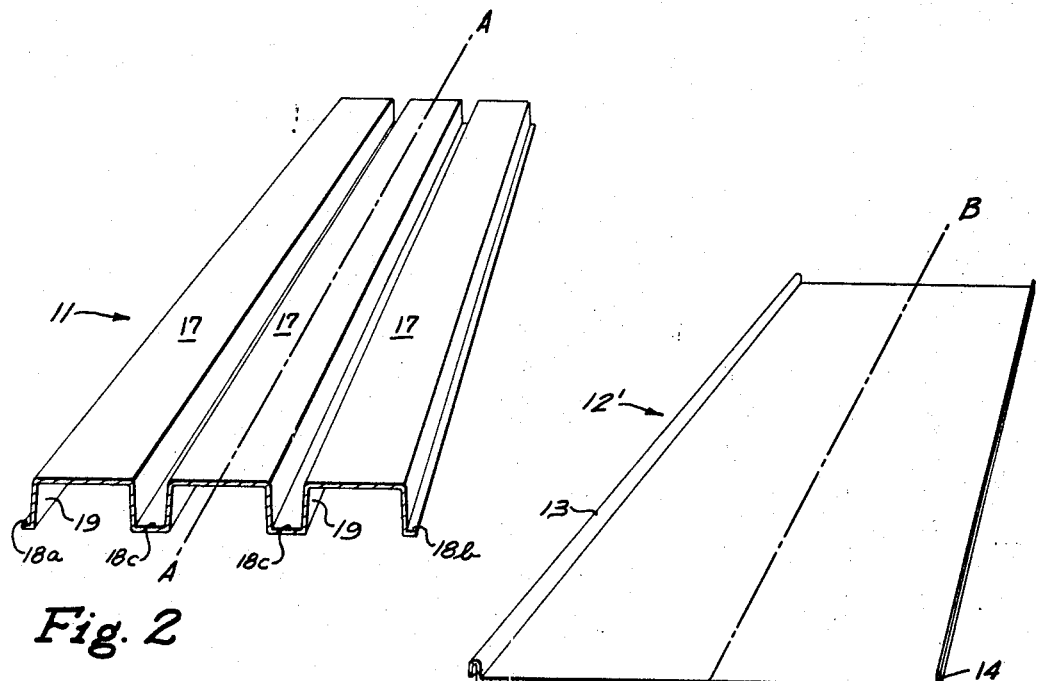
Fig. 2
Fig. 3
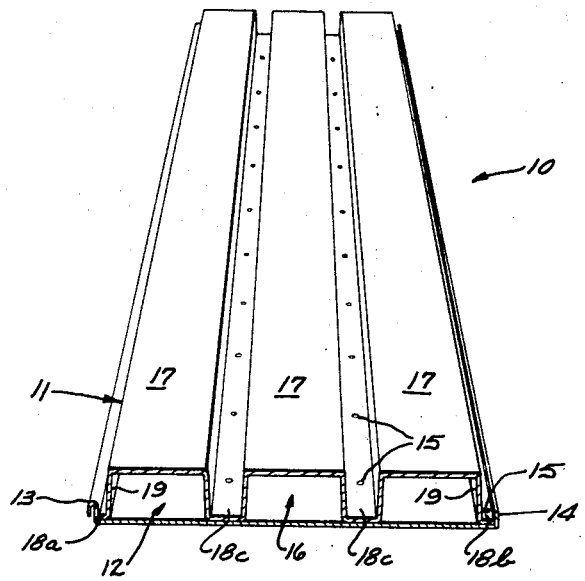
Fig. 1
PRIOR ART
INVENTOR.
ROBERT G. LINDNER
BY
ATTORNEY July 30, 1968  R. G. LINDNER  3,394,514
METAL CELLULAR FLOORING SECTIONS AND COMPOSITE
FLOOR UTILIZING THE SAME
Filed Aug. 29, 1966  2 Sheets-Sheet 2

INVENTOR.
ROBERT G. LINDNER
BY
Harry B Keck
ATTORNEY

United States Patent Office 3,394,514
Patented July 30, 1968

3,394,514
METAL CELLULAR FLOORING SECTIONS AND COMPOSITE FLOOR UTILIZING THE SAME
Robert G. Lindner, Bridgeville, Pa., assignor to H. H. Robertson Company, Pittsburgh, Pa., a corporation of Pennsylvania
Filed Aug. 29, 1966, Ser. No. 575,752
2 Claims. (Cl. 52—332)

ABSTRACT OF THE DISCLOSURE

A building floor structure having metal cellular flooring sections assembled in side-by-side connected relation above the horizontal beams of a building structure. Each metal cellular flooring section comprises a corrugated sheet metal upper element and a correlative flat sheet metal lower element secured thereto. The bilateral axis of the upper element is offset from the bilateral axis of the lower element to expose a lengthwise strip of the lower element along one side of the metal cellular flooring section. At least one shear transfer element is secured directly to a subjacent horizontal beam through the lengthwise strip of at least one metal cellular flooring section. The shear transfer element is positioned to connect a subsequently poured layer of concrete to the subjacent horizontal beams and achieve composite beam construction.

---

This invention relates to improved metal cellular flooring sections and composite floor constructions utilizing the same.

PRIOR ART.—SHEET METAL FLOORING

Sheet metal cellular flooring sections are well known in the construction industry. They are illustrated and described, for example, in U.S. Patents 2,065,546; 3,102,610. Such sections contain at least one corrugated sheet metal element and a corresponding sheet metal element which may be flat or corrugated. The two sheets are assembled together, usually by welding along contiguous areas. The corrugations of one sheet cooperate with the second sheet to form lengthwise cells which are useful in the resulting building for distributing electrical wiring, ventilation and like. The sections have marginal lips for connecting them side-by-side.

PRIOR ART.—COMPOSITE FLOORING

Sheet metal cellular flooring sections with a flat-bottom sheet have been provided with deformations along the crests of the top corrugations and along the vertical webs to achieve composite benefits from such sections with a covering layer of concrete. See Canada Patent 704,842. Other metal cellular flooring sections have been provided with deformations along the vertical webs to achieve composite benefits. See Canada Patent 692,135.

PRIOR ART.—COMPOSITE BEAM

In the assembly of building floors, various shear connectors have been provided to connect the concrete with the building's horizontal beams. The shear connectors are studs (or anchors) welded directly to the beams and projecting above the crest level of the sheet-metal flooring. Suitable studs (or anchors) are shown in U.S. Patents 2,340,176 and 2,987,855. Heretofore, the use of such concrete shear connectors has been limited to corrugated decking having a height of about 1.5 inches. Studs in three-inch high decking have been ineffective because of lack of embedment. Hence, composite beam construction has been restricted to 1.5-inches thick corrugated decking.

THE PRESENT INVENTION

According to the present invention, corrugated decking of three-inches depth can be combined into a building having composite beams. The present invention has utility regardless of the decking thickness, but is of particular interest in this respect.

As provided by the present invention, a sheet-metal cellular section is assembled from a corrugated upper element and a generally flat lower element. The bilateral axis of the upper element is offset from the bilateral axis of the lower element whereby a marginal strip of the lower element is exposed along one of the marginal connecting lips. When sections according to this invention are assembled side-by-side through the marginal connecting lips, a relatively wide strip of the bottom element is exposed between the adjacent lateral cells of the two connected sections. This relatively wide strip accommodates a relatively wide concrete rib in that location when concrete is subsequently poured above the flooring structure. The relatively wide strip also permits installation of shear transferring elements, such as welded studs through the metal cellular flooring directly to the subjacent structural steel by passing solely through the metal of the bottom element in the region of the relatively wide strip.

The present invention, its objects and advantages, will become apparent from the following detailed description by reference to the accompanying drawings in which:

FIGURE 1 is a perspective illustration of cellular metal flooring section according to the prior art;

FIGURE 2 is a perspective illustration of the top element of a cellular metal flooring element according to the present invention;

FIGURE 3 is a perspective illustration of the bottom of a cellular metal flooring section according to the present invention;

Figure 4:
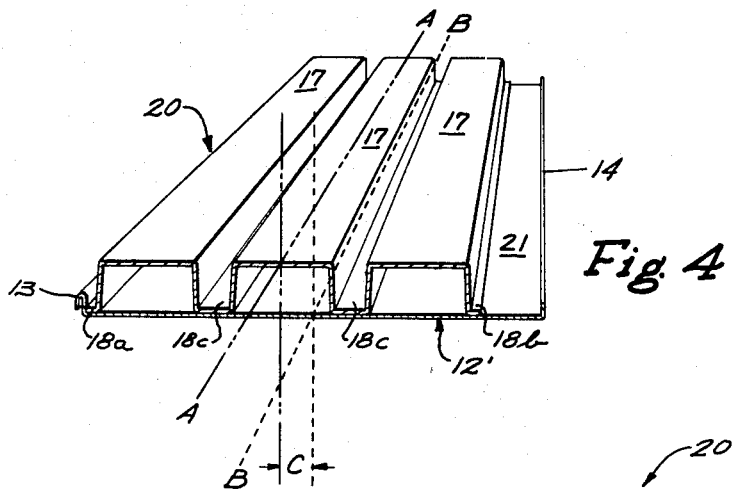
FIGURE 4 is a perspective illustration of the metal cellular flooring section of the present invention.

Referring to FIGURE 1, a prior art metal cellular flooring section 10 has a corrugated upper element and an especially flat bottom element 12 having marginal lips 13, 14 serving as connecting members. The upper element 11 is secured to the lower element 12 by means of spot welds 15. The cellular metal flooring section 10 has three longitudinal cells 16 which serve in a building structure as passageways for electrical wiring, ventilation and the like. Both the upper element 11 and the lower element 12 are essentially rectangular in plan view. The upper element 11 of FIGURE 1 has three crests 17 and four valleys 18 which are connected by generally sloping webs 19.

The upper element 11 is illustrated as a disassembled component in FIGURE 2. The lower element 12', according to the present invention, is shown as a disassembled element in FIGURE 3.

It will be observed that the upper element 11 has a bilateral axis shown by the broken line A—A, and the lower element 12' has a bilateral axis shown by the broken line B—B. In the cellular metal flooring of the prior art (FIGURE 1), the bilateral axis of the upper element 11 lies in the same vertical plane with the bilateral axis of the lower element 12.

According to the present invention, as shown in FIGURE 4, the bilateral axis A—A of the upper element 11 is displaced from the bilateral axis B—B of the lower element 12' by an offset distance C. As a result, the flooring section 20 of the FIGURE 4 has a side valley 18a which is adjacent to the lip 13 while the opposite side valley 18b is spaced apart from the lip 14. Thus a relatively wide strip 21 is presented adjacent to the marginal lip 14. The strip 21 constitutes an exposed surface of the lower element 12'. The strip 21 is substantially wider than the normal width of the valleys 18c of the upper element 11.

Figure 5:
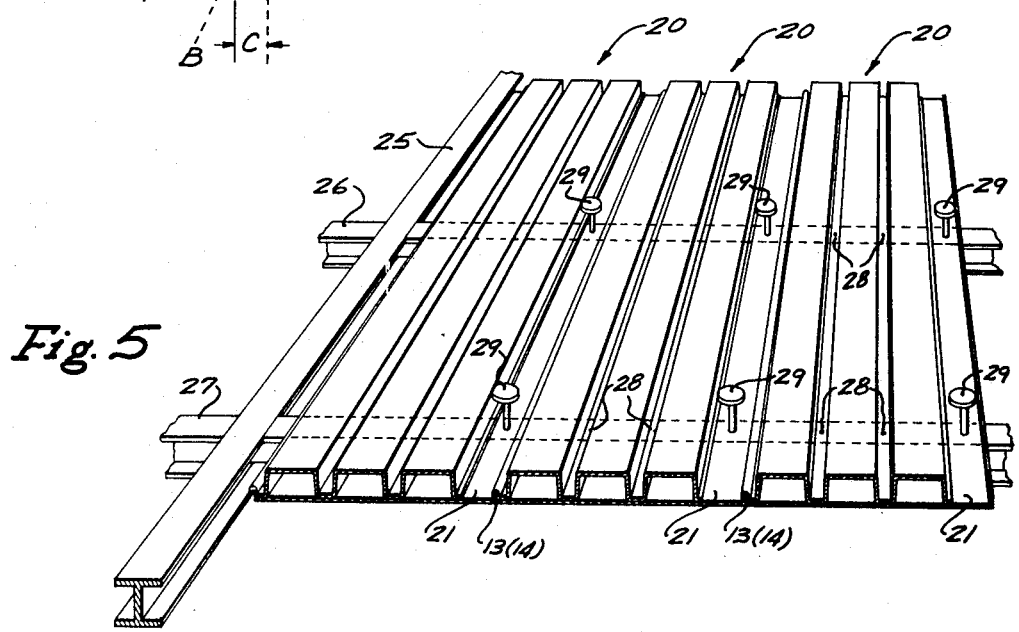
FIGURE 5 is a fragmentary perspective illustration of a floor construction utilizing the present cellular metal flooring sections and composite beam construction.

When the sections according to this invention are assembled side-by-side as shown in FIGURE 5, the relatively wide strips 21 are presented between the lateral adjoining cells of the two connected sections. The floor assembly of FIGURE 5 includes horizontal beams 25, 26, 27 to which the metal cellular flooring sections 20 are secured usually by means of spot welds 28 in the valleys 18 connecting the upper flanges of the beams 26, 27. The relatively wide strips 21 receive welded studs 29 which extend through the strip 21 directly to the upper flange of the horizontal beams 26, 27 as better seen in FIGURE 6. The studs 29 are integral with the upper flange of the beams by means of a weld 30.

Typical studs 29 have a shaft diameter of 0.5–1.0 inch and a head diameter of 1.0–2.0 inch. The head of the stud 29 is maintained above the crests 17 and at least 1 inch below the upper level of the subsequently poured concrete 31. The function of the studs 29 is to transfer shear stresses from the concrete 31 directly to the subjacent beam 26. According to the present invention, the studs 29 are fully efficient for this purpose inasmuch as they are provided in the relatively wide strip 21 made available by the present flooring sections. The relatively wide strip 21 permits sufficient embedment for the studs 29 to enable them to achieve full efficiency. Heretofore, it has not been possible to achieve fully efficient shear transfer with studs where the height of the metal cellular flooring 20 has three inches.

Figure 6:
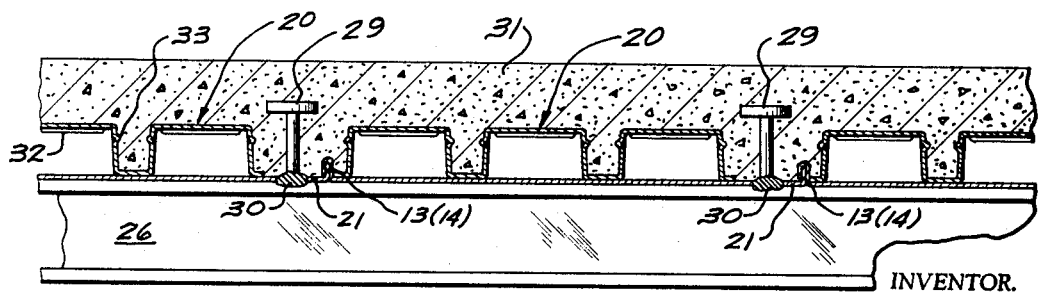
FIGURE 6 is a fragmentary cross-sectional view taken through a building floor adapted for composite floor construction and composite beam construction.

It will further be observed by inspection of FIGURE 6 that the fastening of these studs 29 to the upper flange of the beam 26 can be achieved by welding through a single thickness of sheet metal which forms the wide strip 21. At the present time, electrical stud welding equipment is available which will satisfactorily produce a welded connection 30 through a single thickness of sheet metal. There are no available welding devices today which will satisfactorily weld a stud through two thicknesses of metal. The metal cellular floor sections of the present invention uniquely provide the single thickness strip 21 to accommodate such electrical welding of the studs. The use of such electrically welded studs avoids the need to cut holes in the sheet metal flooring sections above the building beams to expose the beam flanges to receive studs directly.

If desired, the metal cellular flooring sections 20 may be equipped with crest deformations 32 and web deformations 33 of the type described in Canada Patent 704,842 to achieve composite floor construction in addition to composite beam construction.

While the sections 20 of FIGURES 4, 5, 6 are shown with three crests 17 and two intervening valleys 18c and two lateral valleys 18a, 18b, it should be apparent that more or fewer crests could be provided. The minimum condition is where a single crest 17 and a pair of lateral valleys is presented. Sections with four crests and five valleys are commonplace.

The relatively wide strip 21 is defined as the region between the lateral edge of the lateral valley 18b and the marginal lip 14. There is a corresponding marginal strip on the other side of the flooring section between the lateral edge of the lateral valley 18a and the marginal lip 13.

By providing the offset distance C (FIGURE 4) at least 0.75 inch, the marginal strip 21 will be at least 1.5 inches wider than the corresponding marginal strip at the other side of the flooring section 20.

All of the cellular flooring sections of the prior art are provided with upper elements located with their bilateral axis approximately in substantial alignment with the bilateral axis of the lower elements. The concept of deliberately offsetting the bilateral axis of the upper element from the bilateral axis of the lower element is novel. The resulting structure permits the development of composite beam construction with three-inch deep metal cellular flooring—a result of which has not heretofore been achieved.

A further benefit from the present invention is the versatility of section module which can be achieved. By providing a single upper element 11 (FIGURE 2), the section module or width can be altered conveniently by simply widening or narrowing the lower element 12' (FIGURE 3). The minimum module is that obtained by the prior art techniques shown in FIGURE 1. Wider modules are required in order to achieve the benefits of the present invention with the same upper element 11. Non-standard modules can be readily accommodated with the present flooring sections as an incidental benefit to the achievement of composite beam construction.

I claim:

1. In a building floor structure having horizontal beams, metal cellular flooring sections assembled in side-by-side connected relation above said horizontal beams, and a layer of concrete covering said metal cellular flooring sections, each of said metal cellular flooring sections comprising a corrugated upper element having alternating crests and valley and generally vertical webs connecting adjacent ones of said crests and said valleys, and a correlative flat lower element secured to said corrugated upper element and cooperating with said crests and said webs to define generally parallel enclosed cells, the said lower element being wider than the said upper element and having marginal connecting means, the improvement comprising:

The bilateral axis of said upper element being offset from the bilateral axis of said lower element by at least 0.75-inch to expose a lengthwise strip of said lower element along one of said marginal connecting means; and at least one shear transfer element secured to a subjacent horizontal beam through the metal sheet of the said lengthwise strip, said shear transfer element being embedded in a said layer of concrete and serving to transfer shear stresses from the concrete directly to said subjecent horizontal beam.

2. The improvement defined in claim 1 wherein the space between said crests and said lower element is greater than 1.5 inches, and said shear transfer element projects above said crests.

References Cited

UNITED STATES PATENTS

| | | | |
|---|---|---|---|
| 2,049,863 | 8/1936 | Palmer | 52—451 X |
| 2,950,788 | 8/1960 | Edgar | 52—618 X |
| 3,245,186 | 4/1966 | Jentoft | 52—334 |
| 3,267,624 | 8/1966 | Wozniak et al. | 52—332 X |

OTHER REFERENCES

Civil Engineering, TAIC61, October 1961, p. 69, 52–514.

FRANK L. ABBOTT, *Primary Examiner.*

ALFRED C. PERHAM, *Assistant Examiner.*